US012653758B2

(12) United States Patent
Brinz et al.

(10) Patent No.: US 12,653,758 B2
(45) Date of Patent: Jun. 16, 2026

(54) DEVICE FOR SEALING CAPSULES

(71) Applicant: Syntegon Technology GmbH, Waiblingen (DE)

(72) Inventors: Thomas Brinz, Bissingen an der Teck (DE); Philipp Stirm, Fellbach (DE); Stephanie Schütz, Mainhardt (DE)

(73) Assignee: Syntegon Technology GmbH, Waiblingen (DE)

( * ) Notice: Subject to any disclaimer, the term of this patent is extended or adjusted under 35 U.S.C. 154(b) by 0 days.

(21) Appl. No.: 18/700,937

(22) PCT Filed: Nov. 3, 2022

(86) PCT No.: PCT/EP2022/080672
§ 371 (c)(1),
(2) Date: Apr. 12, 2024

(87) PCT Pub. No.: WO2023/083688
PCT Pub. Date: May 19, 2023

(65) Prior Publication Data

US 2025/0248900 A1 Aug. 7, 2025

(30) Foreign Application Priority Data

Nov. 10, 2021 (DE) ..................... 10 2021 129 275.1

(51) Int. Cl.
*A61J 3/07* (2006.01)

(52) U.S. Cl.
CPC .............. *A61J 3/07* (2013.01); *A61J 2200/42* (2013.01); *A61J 2200/44* (2013.01)

(58) Field of Classification Search
CPC ....... B65B 51/20; B65B 63/08; B65B 7/2878; B65B 29/022; B29C 66/1122;
(Continued)

(56) References Cited

U.S. PATENT DOCUMENTS 2,851,786 A * 9/1958 Scherer ................. F26B 15/143
34/267
3,890,765 A * 6/1975 Farfaglia ........... B29C 66/83241
53/563
(Continued)

FOREIGN PATENT DOCUMENTS

CN 107898772 * 4/2018 ................ A61J 3/07
DE 3718320 C2 5/2002
(Continued)

OTHER PUBLICATIONS

International Search Report and Written Opinion for Application No. PCT/EP2022/080672 dated Apr. 11, 2023 (14 pages including English machine translation).
(Continued)

*Primary Examiner* — Linda J. Hodge
(74) *Attorney, Agent, or Firm* — Michael Best & Friedrich LLP

(57) ABSTRACT

The invention relates to a device (22) for sealing capsules (10). Each capsule has a capsule shell which is made of a first shell part and a second shell part, said shell parts being provided with a banding liquid in a connection region. The device has a heat source (30) for drying the banding liquid, and the device has at least one diaphragm (32) which is arranged in a radiation region of the heat source between the heat source and the capsules, wherein the diaphragm has at least one passage region for the passage of radiation of the heat source and for irradiating the connection regions of the capsules, and the diaphragm has at least one shielding region which shields sub-regions of the capsules which are offset to the connection region against radiation of the heat source.

15 Claims, 3 Drawing Sheets

(58) Field of Classification Search
CPC ................. B29C 66/542; B29C 65/103; B29L 2031/7174; A61J 3/07; A61J 3/071; A61J 3/072; A61J 2200/42; A61J 2200/44
USPC ......................... 53/900, 370.9, 373.9; 156/69
See application file for complete search history.

(56) References Cited

U.S. PATENT DOCUMENTS

| | | | | | |
|---|---|---|---|---|---|
| 4,028,024 | A | * | 6/1977 | Moreland | A61J 3/07 425/804 |
| 4,550,238 | A | | 10/1985 | Van Herle et al. | |
| 4,584,817 | A | * | 4/1986 | Yamamoto | A61J 3/072 53/329.2 |
| 4,656,066 | A | * | 4/1987 | Wittwer | A61J 3/071 156/305 |
| 4,734,149 | A | * | 3/1988 | Brown | B29C 65/10 156/499 |
| 4,756,902 | A | | 7/1988 | Harvey et al. | |
| RE33,251 | E | * | 7/1990 | Wittwer | B29C 66/9161 156/305 |
| 4,991,377 | A | | 2/1991 | Marchesini | |
| 5,054,258 | A | * | 10/1991 | Tait | A61J 3/072 198/803.14 |
| 5,230,204 | A | * | 7/1993 | Hall | B65B 3/025 493/134 |
| 5,816,019 | A | * | 10/1998 | Saget | B29C 65/787 156/499 |
| 6,708,465 | B1 | * | 3/2004 | Gustafsson | B65B 51/20 53/529 |
| 6,949,154 | B2 | | 9/2005 | Hochraine et al. | |
| 8,181,425 | B2 | * | 5/2012 | McCutcheon | A61J 3/072 53/329.2 |
| 2010/0212261 | A1 | | 8/2010 | Boldis et al. | |
| 2011/0162783 | A1 | | 7/2011 | Ishikawa et al. | |
| 2020/0182545 | A1 | | 6/2020 | Downey et al. | |

FOREIGN PATENT DOCUMENTS

| | | | | | |
|---|---|---|---|---|---|
| EP | 0360765 | A1 | | 3/1990 | |
| EP | 1800876 | A1 | * | 6/2007 | B41J 11/00218 |
| EP | 2020220 | A1 | | 2/2009 | |
| EP | 2733076 | A1 | * | 5/2014 | B65B 53/063 |
| JP | H0312160 | A | | 1/1991 | |
| JP | 2004535961 | A | | 12/2004 | |
| JP | 2010533013 | A | | 10/2010 | |
| JP | 6778302 | | * | 10/2020 | A61J 3/07 |
| WO | 2009007377 | A1 | | 1/2009 | |
| WO | WO2021205784 | | * | 10/2021 | A61J 2200/44 |

OTHER PUBLICATIONS

German Patent Office Action for Application No. 102021129275.1 dated Aug. 2, 2022 (11 pages including English machine translation).
Japanese Patent Office Action for Application No. 2024527120 dated Mar. 13, 2025 (11 pages including English machine translation).

* cited by examiner

DEVICE FOR SEALING CAPSULES

BACKGROUND

The present invention relates to an apparatus for sealing capsules, wherein the capsules have a respective capsule shell, which is formed by a first shell part and a second shell part, wherein the shell parts are provided or have been provided with a banding fluid in a connecting region, wherein the apparatus comprises a heat source for drying the banding liquid.

DE 37 18 320 C2 discloses a method for sealing capsules consisting of two shell parts. After edge portions of the first shell part and the second shell part have been inserted one into the other, the banding liquid (an aqueous hydroxypropyl methylcellulose (HPMC) solution or gelatin solution, or generally a solution consisting of the capsule material) is applied to an overlapping or connecting region of the capsules. The subsequent drying of the banding liquid is accelerated by introducing heat by way of the heat source, and a solid band of HPMC, gelatin or the capsule material is formed.

The introduction of the heat used for the drying can, however, also cause the contents of a capsule that are enclosed by the capsule shell to be heated. This can lead to an undesired excess pressure inside the capsule shell and, in the worst case, even to separation of the shell parts.

SUMMARY

Taking this as a starting point, the following invention is based on the object of specifying an apparatus which makes it possible to dry the banding liquid with preservation of the capsule.

This object is achieved in the case of an apparatus of the type cited in the introduction in that at least one screen is arranged between the heat source and the capsules, wherein the screen has at least one passage region for the passage of radiation from the heat source and irradiation of the connecting regions of the capsules, and wherein the screen has at least one shielding region, which shields those partial regions of the capsules that are arranged offset relative to the connecting region against radiation from the heat source.

In this respect, the passage region of the screen is in particular in the form of at least one elongate opening, wherein the passage region is delimited by screening regions, which adjoin the elongate opening. A portion of the heat radiation which is incident on the or a shielding region of the screen is blocked. The blocking of the heat radiation in the shielding regions can involve a reflection of heat radiation by the shielding regions and/or an absorption of heat by the shielding regions.

The use of the screen thus makes it possible to focus undirected heat radiation from the heat source that is emitted onto a largely undefined region selectively onto a defined irradiation region.

The spacing between the screen and the capsules, and a width of the passage region perpendicular to the elongate extent of the opening, are preferably matched to the size, in particular the length, of the connecting region of the capsules. If the capsules are suitably arranged within the defined irradiation region, the heat radiation can accordingly precisely act on or in the connecting region of the capsules where banding liquid has been applied and significantly accelerate the drying of the banding liquid. At the same time, irradiation of the capsule regions in which there is no banding liquid is prevented, and heating of the capsule contents and also an associated excess pressure inside the capsule are reduced to a minimum.

The capsules are preferably conveyed using a capsule transporting device after the application of the banding liquid. The capsule transporting device may in particular be in the form of a conveyor belt. The heat source is arranged at a spacing from the conveyor belt. The heat source may extend over a partial length of the conveyor belt or over the entire length of the conveyor belt.

The capsules arranged on the conveyor belt are oriented with their respective longitudinal axis perpendicular to a transporting direction. The capsules are preferably driven in rotation about their respective longitudinal axes during the transport in the transporting direction. The configuration of the conveyor belt makes it possible to keep the positions of the respective connecting regions provided with banding liquid of adjacent capsules in line relative to one another along the transporting direction.

In a preferred embodiment, a main axis of the passage region of the screen extends parallel to the transporting direction of the capsules. In combination with the orientation of the capsules that was explained above, this ensures an input of heat onto connecting regions of the capsules that are in line with one another in the transporting direction over at least part of the transport line of the transporting device, while those partial regions of the capsules that are respectively arranged offset relative to the connecting region are not exposed to any direct heat radiation.

The heat source particularly preferably comprises at least one infrared radiator. The use of an infrared radiator has the advantage that the frequency range of the infrared radiation can be matched to the solvent used in the banding liquid, as a result of which this solvent is selectively excited. This makes it possible to considerably increase a sublimation rate of the solvent and make the drying faster, thereby enabling a higher capsule throughput. Moreover, a space requirement for the apparatus, in particular a transport line, can be reduced.

Furthermore, it is preferred that the heat source comprises at least two infrared radiators, the radiation from which differs in terms of their frequency ranges and/or their intensities. The frequency ranges can be selected here such that they are respectively matched to the selective excitation of different solvents. In this way, different solvents can be dried in a rapid sequence and without retrofitting the apparatus. If use is made of infrared radiators with different intensities, the thermal loading on potentially thermally sensitive contents of the capsules can be reduced. In this case, it is also possible to dispense with complex retrofitting of the apparatus.

Furthermore, it is preferred that the apparatus comprises a cooling device for cooling the screen. The screen absorbs non-reflected heat radiation on its side facing the heat source, as a result of which the shielding regions of the screen heat up, a possible result of which is the emission of heat onto the capsules on that side of the screen that faces away from the radiation source. By cooling the screen, the absorbed heat can be discharged and an undesired emission of heat onto the capsules can be prevented. The cooling can, for example, be realized by a water line connected to a water circuit, wherein the water line lies on or is integrated in the shielding regions.

In one preferred embodiment, the apparatus comprises at least one fan device, which applies an air stream to a surrounding area of the capsules and/or a surrounding area of the screen. The air stream can thus be used to cool the screen and/or transport away the sublimated solvent of the banding liquid. Optionally, the air of the air stream can be pre-dried, as a result of which a greater quantity of the sublimated solvent can be taken up. Transporting the solvent away increases the sublimation rate of the solvent out of the banding liquid and thus accelerates the drying.

The air stream particularly preferably has a flow direction which extends counter to the transport direction of the capsules. This makes it possible to withdraw the sublimated solvent quickly and efficiently.

Furthermore, it is preferred that the fan device comprises a flow divider, which divides the air stream into two portions. A first portion of the air stream is used to cool the screen; a second portion of the air stream makes it possible to transport away the sublimated solvent.

In particular, it is preferred that the first portion of the air stream flows in a first partial space delimited by the heat source and the screen, and that the second portion of the air stream flows in a second partial space delimited by the screen and the capsules. In this way, the first portion of the air stream can be used selectively for cooling the screen and the second portion of the air stream can be used selectively for transporting away the sublimated solvent.

Furthermore, it is preferred that the apparatus comprises at least one suction extracting device for extracting the air stream or at least one portion of the air stream by suction. Extraction by suction prevents the accumulation of air, which is heated up after the screen is cooled and/or is saturated with sublimated solvent.

In a preferred embodiment, a filter is mounted between the heat source and the screen. In this case, the filter can reduce the intensity of the radiation, thereby in particular reducing the thermal loading of potentially thermally sensitive capsule contents. Furthermore, a wavelength-selective filter can be used in order to optimize the frequency range of the heat radiation to match the solvent used.

An additional screen is particularly preferably arranged between the heat source and the screen, wherein a passage region of the additional screen is in line with the passage region of the screen as seen in the radiation direction of the heat source. The additional screen makes it possible to block a significant proportion of the heat radiation, which would otherwise be incident on the shielding regions of the screen. Since the heating of the screen is considerably reduced, this screen emits less heat radiation onto the capsule regions that do not have banding liquid, and the capsule contents are heated to a lesser extent.

Furthermore, it is preferred that the passage region of the additional screen is smaller than the passage region of the screen. Since the radiation propagates conically after passing through the additional screen, it is thus possible to have the effect of focusing the radiation onto the passage regions of the screen, as a result of which the heating of the screen is further reduced.

BRIEF DESCRIPTION OF THE DRAWINGS

The following description and the diagrammatic illustration of embodiments of the apparatus relate to further features and advantages of the invention.

In the drawing.

DETAILED DESCRIPTION

Figure 1:
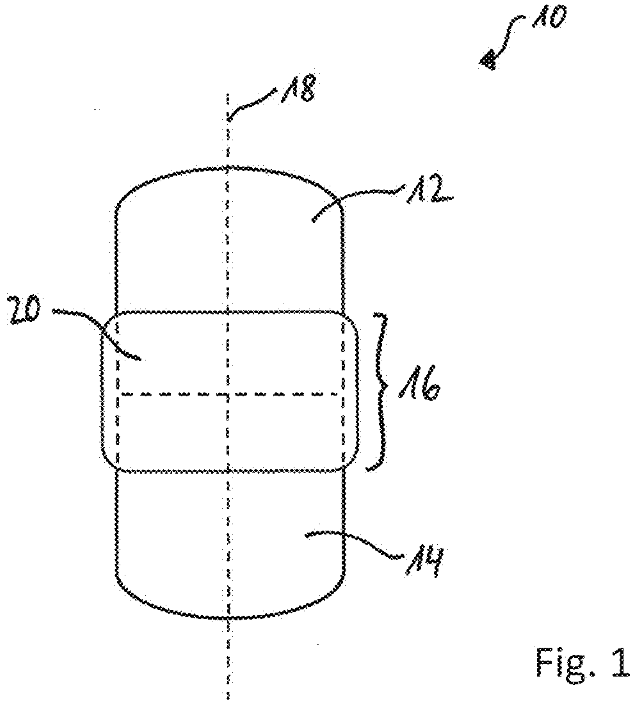
FIG. 1 shows a plan view of an individual capsule, comprising a first shell part and a second shell part with an applied banding.

FIG. 1 shows, by way of example, a capsule 10, which comprises a first capsule shell 12 and a second capsule shell 14. In a manner known per se, the capsule shells 12, 14 are inserted telescopically one into the other by way of mutually facing edge portions in an overlapping or connecting region 16 of the capsule 10. The capsule 10 extends along a central capsule axis 18.

A banding liquid 20, which extends along a closed circumference around the capsule axis 18, is applied to an outer side of the connecting region 16. The banding liquid 20 may, for example, be an aqueous gelatin solution. After the banding liquid 20 has dried, a solid band that seals the capsule 10 and can serve as integrity protection is produced.

Figure 2:
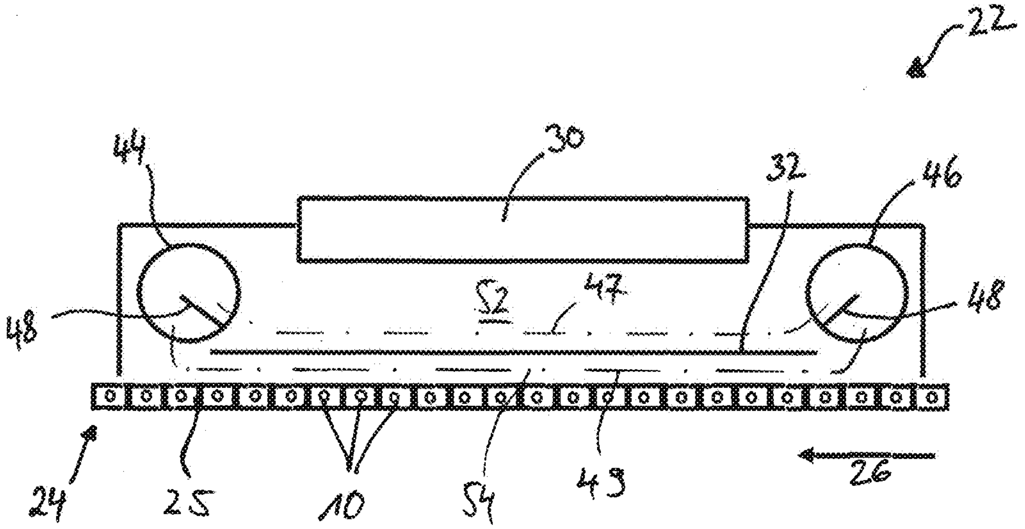
FIG. 2 shows a side view of one embodiment of an apparatus for sealing capsules.

FIG. 2 shows an apparatus, denoted overall by the reference sign 22, for sealing the capsules 10 with banding liquid 20. After the banding liquid 20 has been applied, the capsules 10 are conveyed on a capsule transporting device 24, for example a conveyor belt 25.

Figure 4:
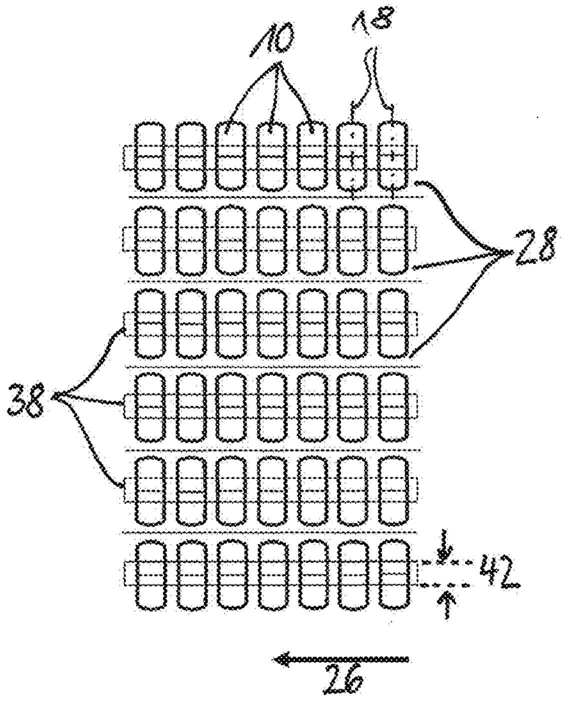
FIG. 4 shows a plan view of a capsule transporting device of the apparatus according to FIG. 1 with capsules.

In this respect, the conveyor belt 25 may have multiple transport regions 28, which extend parallel to a transporting direction 26 and are each intended to receive a plurality of capsules 10; cf. FIG. 4. The capsules 10 are preferably arranged along the respective transporting regions 28 such that the capsule axes 18 of the capsules 10 arranged in a transport region 28 are oriented parallel to one another.

Figure 3:
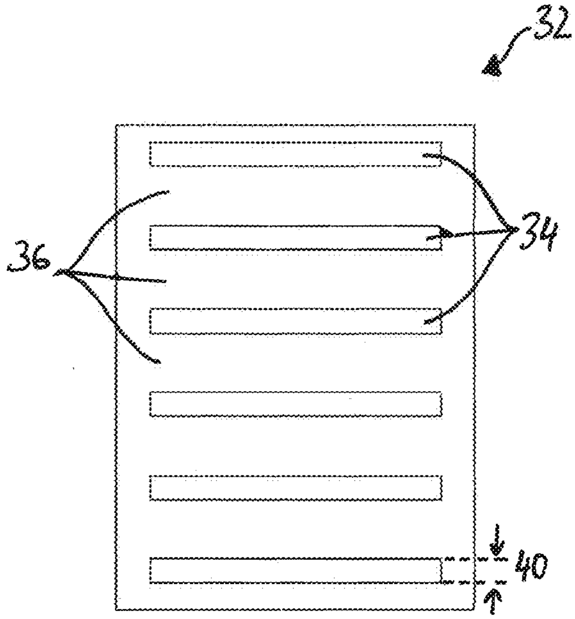
FIG. 3 shows a plan view of a screen of the apparatus according to FIG. 1.

A heat source 30, in particular an infrared radiator, is arranged at a spacing from the conveyor belt 25. A screen 32 is located between the heat source 30 and the conveyor belt 25; cf. FIG. 2. The screen 32 is made, for example, of a stainless steel or a stainless steel alloy and has a plurality of passage regions 34 and shielding regions 36 (cf. FIG. 3). Here, the passage regions 34 are in the form of elongate openings, the respective main axes of which are oriented parallel to the transporting direction 26 of the capsules. The passage regions 34 are delimited by the shielding regions 36.

The heat radiation emitted by and propagating from the heat source 30 is incident on the screen 32. There, the heat radiation is absorbed in the shielding regions 36 of the screen 32 and/or reflected back from the shielding regions 36 in the direction of the heat source 30. The heat radiation can be incident on the conveyor belt 25 and the capsules 10 located thereon only through the passage regions 34. The heat radiation is thus focused onto a defined irradiation region 38 by means of the passage regions 34.

The capsules 10 are preferably arranged on the conveyor belt 25 with their capsule axis 18 perpendicular to the transporting direction 26. The connecting regions 16 of adjacent capsules 10 are also preferably oriented in line with one another (cf. FIG. 4).

The spacing between the screen 32 and the conveyor belt 25, and a width 40 of a passage region 36 (cf. FIG. 3), are preferably matched to a length of the connecting region 16 of a capsule 10 measured parallel to the capsule axis 18, with the result that a width 42 of the irradiation region 38 matches the length of the connecting region 16 of a capsule 10 (cf. FIGS. 1 and 4). In this way, it is possible to achieve an input of heat preferably exclusively onto the banding liquid 20, while at the same time the thermal loading of the capsule regions that are arranged offset relative to the connecting region 16 is reduced to a minimum.

The apparatus optionally comprises a fan device 44 and a suction extracting device 46, which are arranged at mutually opposite ends of the conveyor belt 25. The fan device 44 serves to generate an air stream, the flow direction of which preferably extends counter to the transporting direction 26 of the capsules 10.

The fan device 44 and the suction extracting device 46 map optionally comprise respective flow dividers 48, which serve to divide the air stream into two portions. A first portion 47 of the air stream (within a first partial space 52 of the apparatus 22) enables a selective action on the screen 32; a second portion 49 of the air stream (within a second partial space 54 of the apparatus 22) enables a selective action on the capsules 10. In this respect, the first portion 47 of the air stream can be used to cool the screen 32; the second portion 49 of the air stream can be used to transport away a sublimated solvent.

Figure 5:
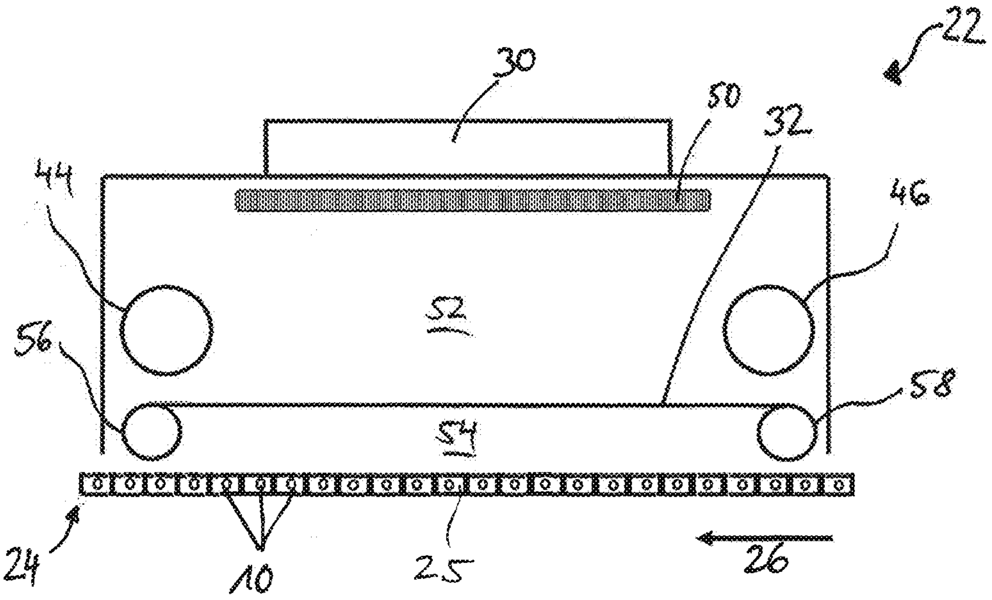
FIG. 5 shows a side view of a further embodiment of an apparatus for sealing capsules.

FIG. 5 shows a further embodiment of an apparatus 22, wherein a filter 50 is arranged between the heat source 30 and the screen 32. The filter 50 may be in the form of an intensity filter and/or a wavelength-selective filter.

A first fan device 44 and a first suction extracting device 46 are arranged in a first partial space 52 of the apparatus 22, which extends between the heat source 30 and the screen 32.

A second fan device 56 and a second suction extracting device 58 are arranged in a second partial space 54 of the apparatus 22, which extends between the screen 32 and the conveyor belt 25.

The screen 32 extends from a side of the second fan device 56 that faces away from the conveyor belt 25 to a side of the second suction extracting device 58 that faces away from the conveyor belt 25. In this way, the screen 32 with the shielding regions 36 acts as a boundary between a first air stream, which is assigned to the first partial space 52 and serves to cool the screen, and a second air stream, which is assigned to the second partial space 54 and serves to transport away the sublimated solvent. The air streams mentioned preferably each flow counter to the transporting direction 26 of the capsules 10. The separation of the air streams mentioned allows precise control of the properties of the respective air used for an air stream. It is thus possible, in particular, to pre-dry the air of the second air stream assigned to the second partial region 54, as a result of which a greater quantity of sublimated solvent can be taken up by the air of this second air stream.

Figure 6:
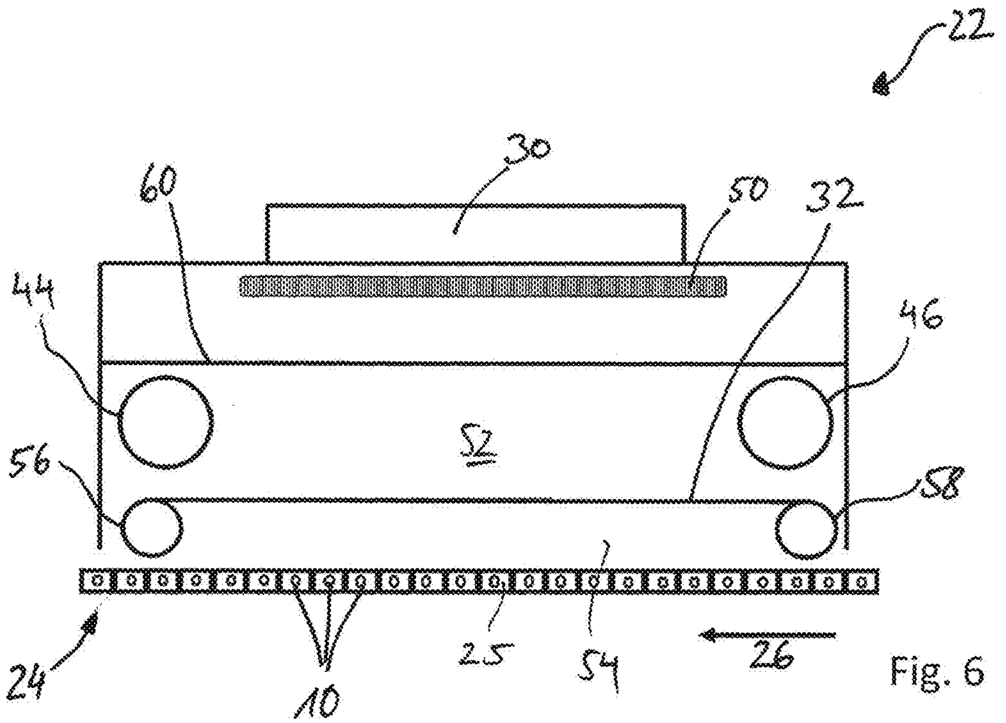
FIG. 6 shows a side view of a further embodiment of an apparatus for sealing capsules.
Figure 7:
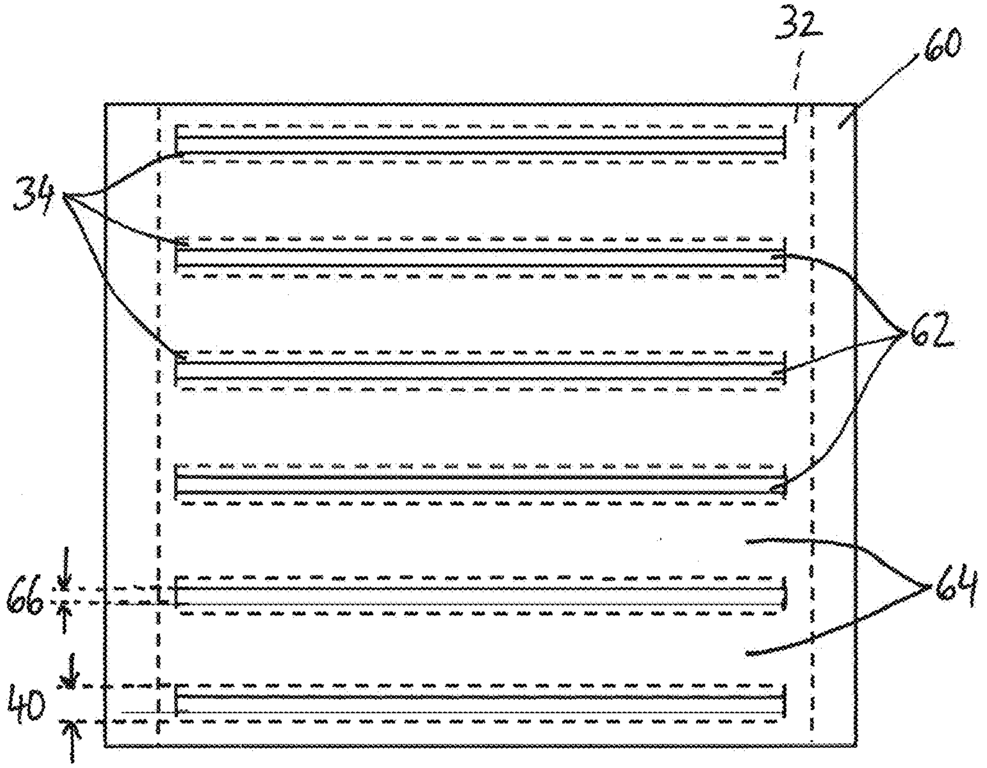
FIG. 7 shows a plan view of a screen and an additional screen of the apparatus according to FIG. 6.

FIGS. 6 and 7 show a further embodiment of an apparatus 22, wherein an additional screen 60 is arranged between the heat source 30 and the screen 32 as seen in the emission direction of the heat source 30. The additional screen 60 has at least one passage region 62, which is delimited by at least one shielding region 64.

The number of passage regions 62 of the additional screen 60 is preferably matched to the number of passage regions 34 of the screen 32 (cf. FIG. 7). Due to the additional screen 60, a significant proportion of the heat radiation is blocked, as a result of which heating of the screen 32 is minimized. A width 66 of the passage regions 62 of the additional screen 60 is preferably less than the width 40 of the passage regions 34 of the screen 32, so that the heat radiation from the heat source 30 is oriented onto the passage regions 34 of the screen 32 by means of the additional screen 60.

What is claimed is:

1. An apparatus (22) for sealing capsules (10), wherein the capsules (10) have a respective capsule shell, which is formed by a first shell part (12) and a second shell part (14), wherein the shell parts (12, 14) are provided or have been provided with a banding liquid (20) in a connecting region (16), wherein the apparatus (22) comprises the capsules (10) and a heat source (30) for drying the banding liquid (20), wherein the apparatus (22) has at least one screen (32), which is arranged in a radiation region of the heat source (30) between the heat source (30) and the capsules (10), wherein the screen (32) has at least one elongate opening (34) having a length dimension that is longer than a width dimension (40) and being positioned such that radiation from the heat source (30) to the capsules (10) irradiates the connecting regions (16) of the capsules (10), wherein the screen (32) has at least one shielding region (36), and wherein the screen (32) is arranged such that the length dimension of the at least one elongate opening (34) extends parallel to a transport direction (26) of the capsules (10), and wherein the capsules (10) are positioned such that the connecting region (16) of the capsules (10) passes under, relative to the heat source (30), the at least one elongate opening (34) while partial regions of the capsules (10) that are arranged offset from the connecting region (16) are shielded against radiation from the heat source (30) by the shielding region (36), the connecting region of the capsules having a length dimension measured parallel to a capsule axis, the width dimension of the at least one elongate opening matching the length dimension of the connecting region, and the screen and the capsules transported in the transport direction are spaced, such that, with respect to the capsule capsules (10), the radiation from the heat source (30) is input exclusively onto the banding liquid (20).

2. The apparatus (22) as claimed in claim 1, wherein the apparatus (22) comprises a capsule transporting device (24).

3. The apparatus (22) as claimed in claim 1, wherein the heat source (30) comprises at least one infrared radiator.

4. The apparatus (22) as claimed in claim 1, wherein the heat source (30) comprises at least two infrared radiators, the radiation from which differs in terms of frequency ranges and/or intensities.

5. The apparatus (22) as claimed in claim 1, wherein the apparatus (22) comprises a cooling device for cooling the screen (32).

6. The apparatus (22) as claimed in claim 1, wherein the apparatus (22) comprises at least one fan device (44), which applies an air stream to a surrounding area of the capsules (10) and/or a surrounding area of the screen (32).

7. The apparatus (22) as claimed in claim 6, wherein the air stream has a flow direction which extends counter to the transport direction (26) of the capsules (10).

8. The apparatus (22) as claimed in claim 7, wherein the at least one fan device (44) comprises a flow divider (48), which divides the air stream into a first portion (47) for cooling the screen (32) and a second portion (49) for transporting away solvent which has evaporated out of the banding liquid (20).

9. The apparatus (22) as claimed in claim 6, wherein the at least one fan device (44) comprises a flow divider (48), which divides the air stream into a first portion (47) for cooling the screen (32) and a second portion (49) for transporting away solvent which has evaporated out of the banding liquid (20).

10. The apparatus (22) as claimed in claim 9, wherein the first portion (47) of the air stream flows in a first partial space (52) delimited by the heat source (30) and the screen (32), and wherein the second portion (49) of the air stream flows in a second partial space (54) delimited by the screen (32) and the capsules (10).

11. The apparatus (22) as claimed in claim 6, wherein the apparatus (22) comprises at least one suction extracting device (46) for extracting the air stream or at least one portion (47, 49) of the air stream by suction.

12. The apparatus (22) as claimed in claim 1, wherein the apparatus (22) comprises at least one filter (50), which is arranged between the heat source (30) and the screen (32).

13. The apparatus (22) as claimed in claim 1, wherein the apparatus (22) comprises an additional screen (60), which is arranged in the radiation region of the heat source (30) and is upstream of the screen (32) in a radiation direction of the heat source (30).

14. The apparatus (22) as claimed in claim 13, wherein at least one elongate opening (62) of the additional screen (60) is in line with the at least one elongate opening (34) of the screen (32) as seen in the radiation direction of the heat source (30).

15. The apparatus (22) as claimed in claim 14, wherein the at least one elongate opening (62) of the additional screen (60) is smaller or larger than the at least one elongate opening (34) of the screen (32).

* * * * *